United States Patent
Endo et al.

(10) Patent No.: US 7,526,368 B2
(45) Date of Patent: Apr. 28, 2009

(54) PARKING ASSIST APPARATUS

(75) Inventors: Tomohiko Endo, Toyota (JP); Hisashi Satonaka, Susono (JP); Yuichi Kubota, Okazaki (JP); Akira Matsui, Toyota (JP); Hideyuki Iwakiri, Tajimi (JP); Toru Sugiyama, Toyota (JP); Seiji Kawakami, Susono (JP); Katsuhiko Iwazaki, Suntou-gun (JP); Hiroaki Kataoka, Susono (JP); Yuu Tanaka, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 975 days.

(21) Appl. No.: 10/927,819

(22) Filed: Aug. 27, 2004

(65) Prior Publication Data
US 2005/0049767 A1 Mar. 3, 2005

(30) Foreign Application Priority Data
Aug. 28, 2003 (JP) ............................. 2003-209334

(51) Int. Cl.
G06F 7/00 (2006.01)
(52) U.S. Cl. ........................... 701/36; 701/41; 701/300
(58) Field of Classification Search ................ 701/1, 701/36, 23, 41, 45, 117, 224, 300, 301, 302; 348/113, 116, 119; 180/204, 271; 280/282
See application file for complete search history.

(56) References Cited

U.S. PATENT DOCUMENTS

| 7,227,515 | B2* | 6/2007 | Kormos ........................ 345/60 |
| 7,265,656 | B2* | 9/2007 | McMahon et al. .......... 340/435 |
| 2002/0128750 | A1 | 9/2002 | Kakinami et al. | |

FOREIGN PATENT DOCUMENTS

| EP | 1332948 A1 | 6/2003 |
| JP | 11-208420 | 8/1999 |
| JP | 2003-212073 A | 7/2003 |

OTHER PUBLICATIONS

Search Report from the European Patent Office.

* cited by examiner

*Primary Examiner*—Richard M. Camby
(74) *Attorney, Agent, or Firm*—Kenyon & Kenyon LLP

(57) ABSTRACT

A parking assist apparatus performs a guidance of a vehicle toward a target parking position, even after the guidance has been canceled. The target parking position is set in accordance with an operation applied to a target parking position designation display that is displayed on a screen showing a periphery of the vehicle. It is determined whether a cancellation condition of canceling the guidance of the vehicle toward the target parking position is established. A memory continuously holds target parking position information even after the cancellation condition is established.

9 Claims, 7 Drawing Sheets

PARKING ASSIST APPARATUS

BACKGROUND OF THE INVENTION

1. Field of the Invention

The present invention relates to parking assist apparatuses and, more particularly, to a parking assist apparatus which guides a vehicle to a target parking position using an actual image of a surrounding area of the vehicle.

2. Description of the Related Art

Conventionally, there is known a parking assist apparatus that displays a target parking position designation display on a picture which displays a surrounding area of a vehicle so that a driver of the vehicle can designate the a target position at which the vehicle is to be parked by an operation on the picture. Such a parking assist apparatus is disclosed, for example, in Japanese Laid-Open Application No. 11-208420. In such a parking assist apparatus, a path to the target parking position is generated by computation and the vehicle is guided along the generated path. Additionally, if a target parking position once designated is changed by an operation on the display for designating a target parking position, a path to the changed target parking position is computed again and the vehicle is guided along the recomputed path. Thus, according to the above-mentioned parking assist apparatus, when a target parting position is reset, the vehicle can be guided along a new path to the reset target parking position.

When using the above-mentioned parking assist apparatus, there may be a case in which vehicle guidance is stopped when an inappropriate condition is detected such as that a vehicle speed exceeds an upper limit or that steering of the vehicle is performed intentionally by a driver, in view of maintaining safety during the vehicle guidance or assuring that the trace of the vehicle accurately match the computed path. When the vehicle guidance is stopped, simultaneously, information regarding the position (on absolute coordinates) of the target parking position on a road surface to which the vehicle has been guided, that is, at which the vehicle was to be parked may be eliminated. However, after the position information regarding the target parking position is eliminated, there may be a case that a drive of the vehicle desires to guide the vehicle to the absolute position of the target parking position which has been eliminated. In such a case, it is necessary for the driver to redo the designation of the target parking position from the beginning again by an operation on the display for designating a target parking position. For this reason, in the conventional parking assist apparatus, it may be inconvenient for a driver to perform a resetting operation after vehicle guidance is once stopped.

SUMMARY OF THE INVENTION

It is a general object of the present invention to provide an improved and useful parking assist apparatus in which the above-mentioned problems are eliminated.

A more specific object of the present invention is to provide a parking assist apparatus which can perform a guidance to a target parking position, even after the guidance has been canceled during the guidance to move the vehicle to a target parking position, by a simple operation.

In order to achieve the above-mentioned object, there is provided according to the present invention a parking assist apparatus for guiding a vehicle toward a target parking position, comprising: target parking position setting means for setting the target parking position in accordance with an operation applied to a target parking position designation display that is displayed on a screen showing a periphery of the vehicle; cancellation condition determining means for determining whether a cancellation condition of canceling a guidance of the vehicle toward the target parking position is established; and memory holding means for continuously holding target parking position information regarding the target parking position set by the target parking position setting means after the cancellation condition is established.

In the above-mentioned parking assist apparatus, the memory holding means may continuously hold the target parking position information after the cancellation condition is established and until a next target parking position is newly set by the target parking position setting means.

In the parking assist apparatus according to the present invention, the memory holding means may continuously holds the target parking position information after the guidance of the vehicle toward the target parking position is stopped due to an establishment of the cancellation condition.

In the parking assist apparatus according to the present invention, the target parking position setting means may be capable of setting the absolute position represented by the target parking position information held by the memory holding means as a new target parking position. The parking assist apparatus according to the above-mentioned invention may further comprise screen controlling means for controlling contents displayed on the screen when the guidance of the vehicle is stopped due to an establishment of the cancellation condition so that the contents displayed on the screen is changed in accordance with a result of computation of a path from a current position of the vehicle to the new target parking position. The screen controlling means may shift the screen to an initial screen when the path is not defined by computation. The screen controlling means may also shift the screen to a setting screen for setting the target parking position when the path is defined by computation.

According to the above-mentioned invention, even after the guidance toward the target parking position is cancelled, the same target parking position can be set again by reading the target parking position information held in the memory holding means. Thus, the guidance of the vehicle from the current position to the previously set target parking position can be performed with a simple operation applied to the display, thereby reducing a burden to the driver of the vehicle in setting the target parking position.

Other objects, features and advantages of the present invention will become more apparent from the following detailed description when read in conjunction with the accompanied drawings.

DETAILED DESCRIPTION OF THE PREFERRED EMBODIMENT

Figure 1:
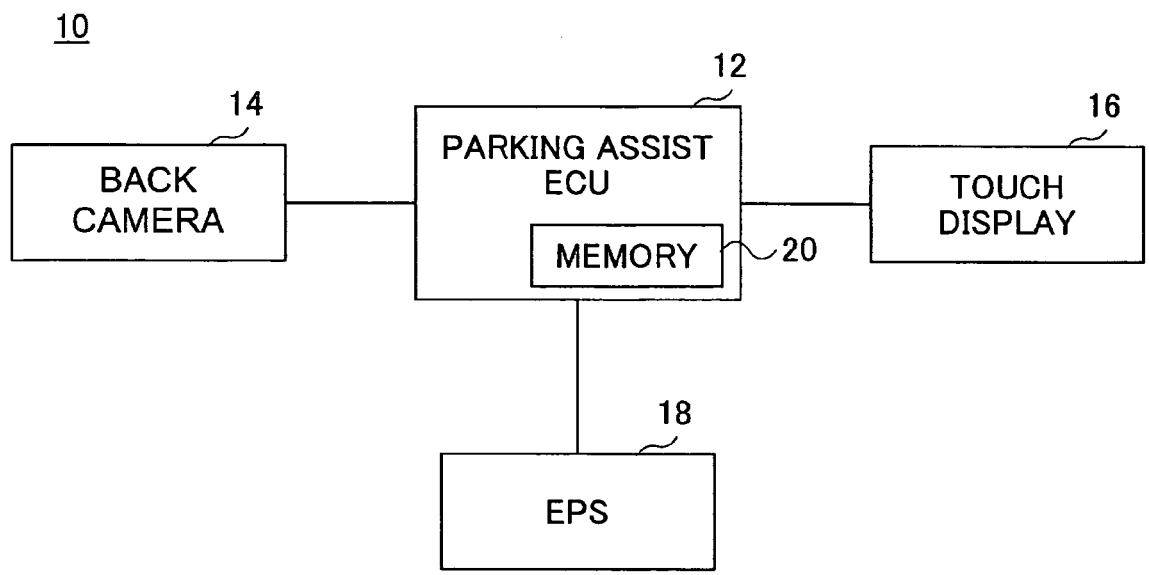
FIG. 1 is a system structural diagram of a parking assist apparatus according to an embodiment of the present invention.

FIG. 1 is a system diagram of a parking assist apparatus 10, which is mounted on a vehicle, according to an embodiment of the present invention. The parking assist apparatus 10 according to the present embodiment performs an automatic vehicle steering without a driver's operation so that the vehicle moves to a target parking position, which is a position at which the vehicle is to be parked and designated by the driver, along a path to the target parking position when performing a parallel parking, for example. Hereafter, the guidance control to the target parking position by the parking assist apparatus is referred to as a parking assist control.

As shown in FIG. 1, the parking assist apparatus 10 is equipped with an electronic control unit 12 for parking assistance (hereinafter referred to as a parking assist ECU), and is controlled by the parking assist ECU 12. A back camera 14 is connected to the parking assist ECU 12. The back camera 14 is provided in the center of a rear part of the vehicle body so as to take an image of an area extending on a rear side of the vehicle with a predetermined angle range. The image information around the rear of the vehicle taken by the back camera 14 is supplied to the parking assist ECU 12.

A touch display 16 is connected to the parking assist ECU 12. The touch display 16 is provided at a position where the touch display 16 can be viewed and operated by the driver of the vehicle. The parking assist ECU 12 displays a real picture taken by the back camera 14 on the touch display 16 when a shift position of the vehicle is at a reverse position. The touch display 16 projects an area around the rear side of the vehicle taken by the back camera 14 on a display screen according to an instruction of the parking assist ECU 12. Moreover, the touch display 16 displays, in accordance with an instruction of the parking assist ECU 12, auxiliary lines and frames by superimposing them on the real picture taken by the back camera 14.

The touch display 16 is provided with a touch operation part of a pressure sensitive type of a temperature sensitive type, which enables an operation of the vehicle driver. The touch operation unit comprises a plurality of hierarchical switches, and is displayed on the display screen according to an instruction of the parking assist ECU 12. The parking assist ECU 12 detects a touch operation of the vehicle driver to the touch operation part, and performs a process according to the contents of the touch operation part. It should be noted that the touch operation part includes, as a parking assist control, a switch for starting a garage guiding mode, a switch for starting a parallel parking mode and an arrow button switch for designating a target parking position at which the vehicle driver parks the vehicle.

An electric power-steering apparatus (hereinafter abbreviated as EPS) 18 is further connected to the parking assist ECU 12. The EPS 18 is equipped with a torque sensor which detects a steering torque applied to a steering shaft by a steering operation performed by the vehicle driver, a steering angle sensor which detects a steering angle of the steering shaft, and an electric motor which gives a torque to the steering shaft. The EPS 18 causes the electric motor to generate a torque for assisting the steering torque during a steering operation by the driver, and, as mentioned above, causes the electric motor to generate a torque for steering the vehicle without a steering operation by the driver when performing a parking operation such as garage parking or parallel parking according to the parking assist control.

The EPS 18 supplies information regarding the detected steering angle of the steering shaft to the parking assist ECU 12. The parking assist ECU 12 supplies a target steering angle, which the steering shaft should achieve as mentioned later, to the parking assistant control EPS 18 when performing the parking assist control. The EPS 18 causes the electric motor to generate the torque for parking assist control by being supplied with the target steering angle information from the parking assist ECU 12.

Moreover, the parking assist ECU 12 has a memory 20 from which data is read or in which data is written. The memory 20 stores position information and path information. The position information indicates a position on a road surface (absolute coordinates), which is set as a target parking position designated by position setting performed by the driver. The path information indicates a path to the target parking position, which path is obtained by calculation. The information stored in the memory 20 is erased when the parking assist control is completed such as when a shift position is shifted from a reverse position to a parking position or a neutral position or when the vehicle moves close to the target parking position.

A description will now be given below of an operation of the parking assist apparatus 10 according to the present embodiment.

Figure 2:
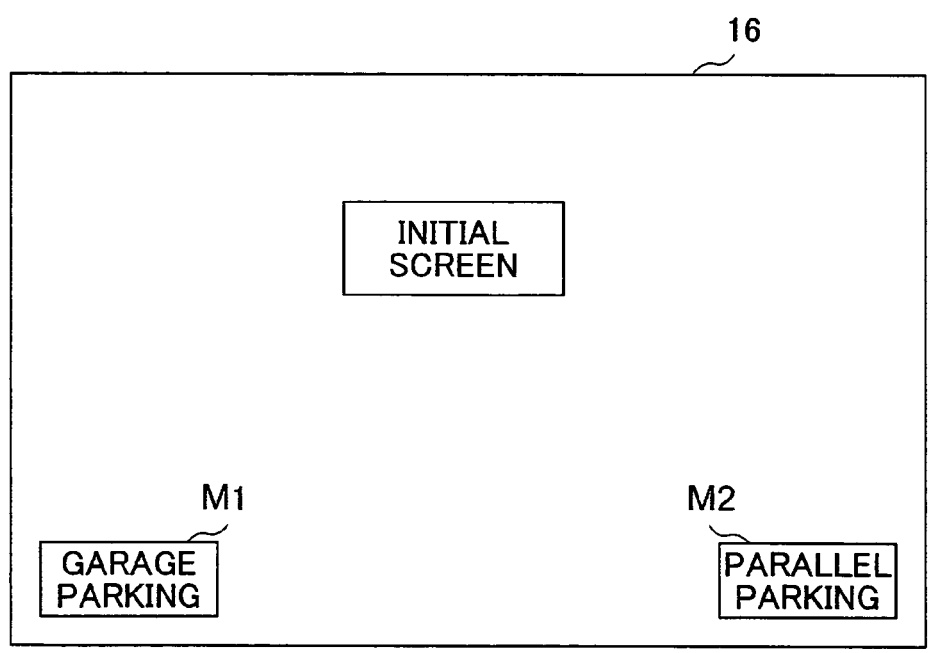
FIG. 2 is an illustration of an initial screen appearing on a display screen of a touch display when performing a parking assist control by the parking assist apparatus shown in FIG. 1.
Figure 3A:
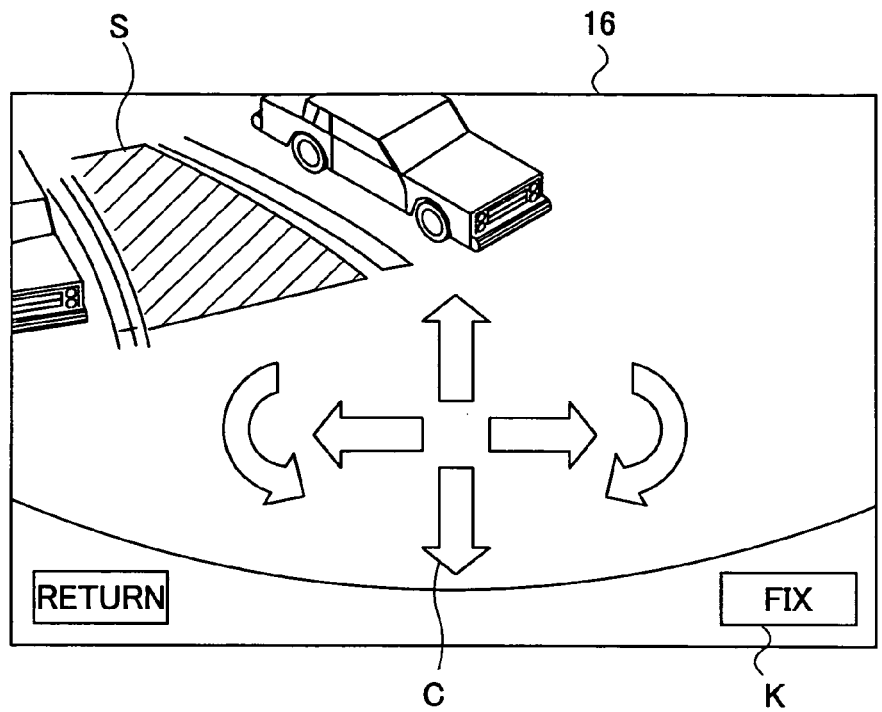
FIG. 3A is an illustration of a scene displayed on the display screen of the touch display when designating a target parking position of a garage parking in the parking assist apparatus according to the present embodiment.
Figure 3B:
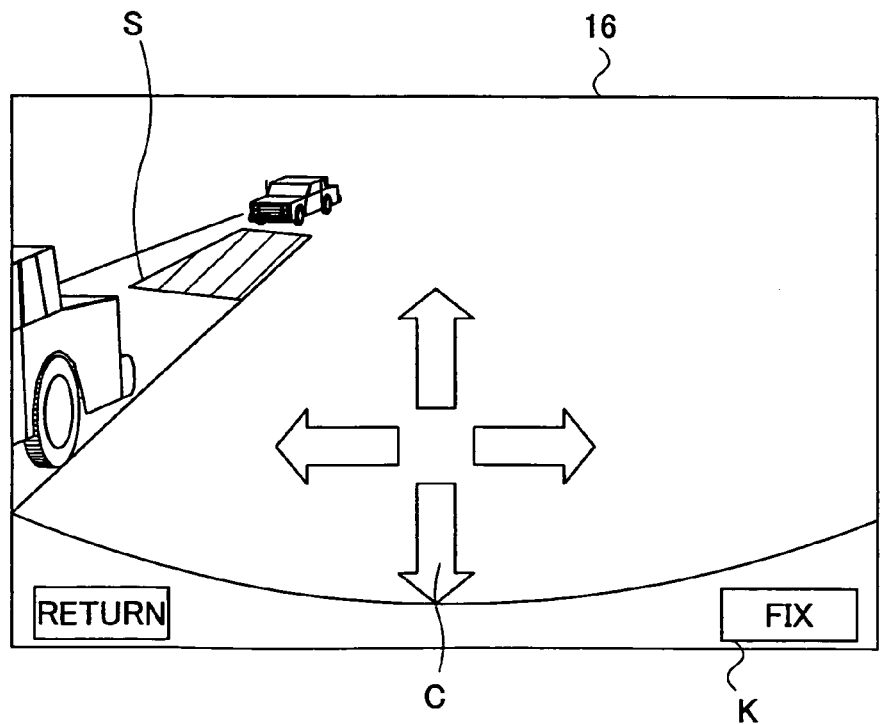
FIG. 3B is an illustration of a scene displayed on the display screen of the touch display when designating a target parking position of a parallel parking in the parking assist apparatus according to the present embodiment.

FIG. 2 shows an initial display appearing on the display screen of the touch display 16 when performing the parking assist control by the parking assist apparatus 10. FIG. 3A shows a scene displayed on the display screen of the touch display 16 when designating a target parking position of a garage parking in the parking assist apparatus 10 according to the present embodiment. FIG. 3B is a scene displayed on the display screen of the touch display 16 when designating a target parking position of a parallel parking in the parking assist apparatus 10 according to the present embodiment.

In the present embodiment, first, when the shift position of the vehicle is shifted to the reverse position, the circumference situation in the rear of the vehicle taken by the back camera 14 is displayed on the display screen of the touch display 16. At this time, as shown in FIG. 2, a switch M1 and a switch M2 appear on the display screen (initial screen). The switch M1 is provided for starting a garage parking mode as the parking assist control. The switch M2 is provided for starting a parallel parking mode as the parking assist control.

When the garage parking mode switch is touched, a frame S (hereinafter referred as a parking space frame) and arrow button switches C are displayed in a superimposed manner while the picture of the rear side of the vehicle taken by the back camera 14 is displayed as shown in FIG. 3A. The parking space frame S indicates a target parking position on the road surface at which the vehicle is to be parked. The arrow button switches C are provided for shifting or rotating the target parking position on the road surface.

The arrow button switches include an upward switch for shifting the target parking position on the road surface in a direction moving away from the vehicle, a downward switch for shifting the target parking position in a direction moving closer to the vehicle, a leftward switch for shifting the target parking position in a leftward direction, a rightward switch for shifting the target parking in a rightward direction, a counterclockwise switch for rotating the target parking position in a counterclockwise direction, and a clockwise switch for rotating the target parking position in a clockwise direction. According to the above-mentioned structure, the target parking position can be shifted in any of the four directions and also rotated in either direction with the center of the position as a rotational axis.

Moreover, when the parallel parking mode switch is touched in the display screen of the touch display 16, the parking space frame S and the arrow button switches C are displayed in a superimposed manner while the picture of the rear side of the vehicle taken by the back camera 14 is displayed as shown in FIG. 3B. The parking space frame S at this time indicates a target parking position on the road surface at which the vehicle is to be parallel-parked.

At this time, the upward switch, the downward switch, the leftward switch and the rightward switch appear, but the counterclockwise switch and the clockwise switch do not appear on the display screen. In the above-mentioned structure, the target parking position can be shifted any of the four directions but cannot be rotated, which allows the target parking position to move in a longitudinal direction and a transverse direction of the vehicle.

The parking space frame S corresponds to the target parking position on the real road surface, and has a rectangular shape of a size substantially equal to the vehicle size if it is projected onto the real road surface. However, on the display screen of the touch display 16, the parking space frame S is formed as a shape corresponding to the position in the picture of the rear of the vehicle (camera coordinates) taken by the back camera 14. Moreover, when the arrow button switches C are touched by the driver, the target parking position is shifted by X cm (for example, 5 cm) or rotated by Y degrees (for example, 1 degree) on the real road surface, and the parking space frame S is shifted on the display screen of the touch display 16. It should be noted that an amount of shift of the parking space frame S on the display screen of the touch display 16 increases as the target parking position is closer to the vehicle due to a perspective relationship in the picture of the rear of the vehicle.

After the parking space frame S and the arrow button switches C are displayed on the display screen of the touch display 16, computation of the path from the present position of the vehicle as an initial position to the target parking position according to the shifted position of the parking space frame S.

Moreover, when the garage-parking mode switch or the parallel-parking mode switch is operated, a fix switch K is displayed in a superimposed manner as shown in FIGS. 3A and 3B in addition to the parking space frame S and the arrow button switches C so as to fix the target parking position according to the parking space frame S. When the fix button K is touched in a state where the path to the target parking position is computed, the designation of the target parking position is fixed, and, thereafter, execution of an automatic steering according to the parking assist control is permitted.

Figure 4:
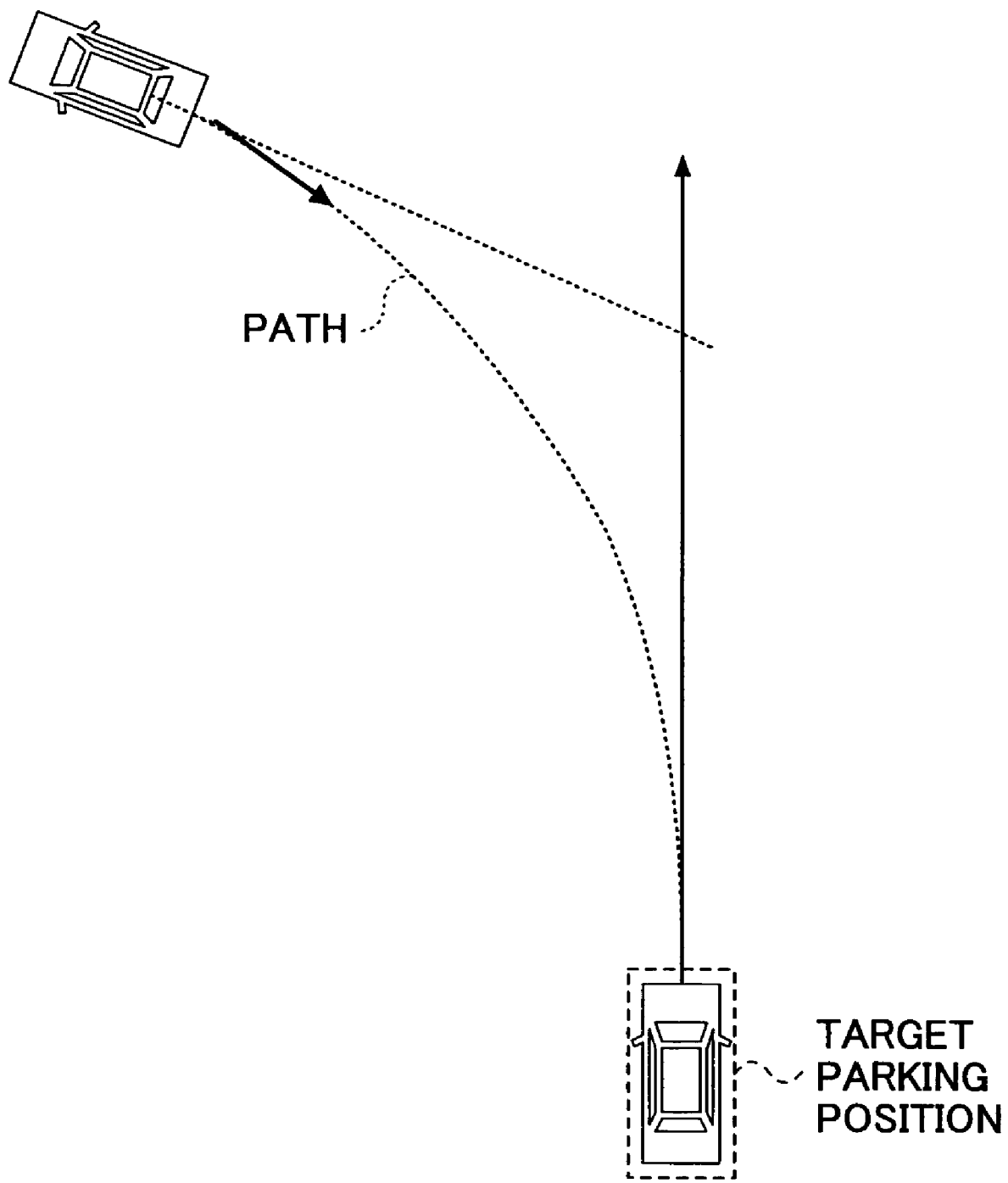
FIG. 4 is an illustration showing a path to a target parking position in a garage parking operation.

FIG. 4 is an illustration showing a path to a target parking position in a garage parking operation. In a garage parking mode, a path of a vehicle to the target parking position is determined, when a predetermined geometric position condition determined according to a relative positional relationship between a minimum turning radius and a present position of the vehicle and the target parking position of the vehicle, so that the following sections are appropriately defined: 1) a straight forward or backward section of a predetermined distance; 2) an increasing steering angle section; 3) a fixed steering angle section; 4) a steering angle returning section; and 5) a predetermined straight forward or backward section with a predetermined distance.

Figure 5:
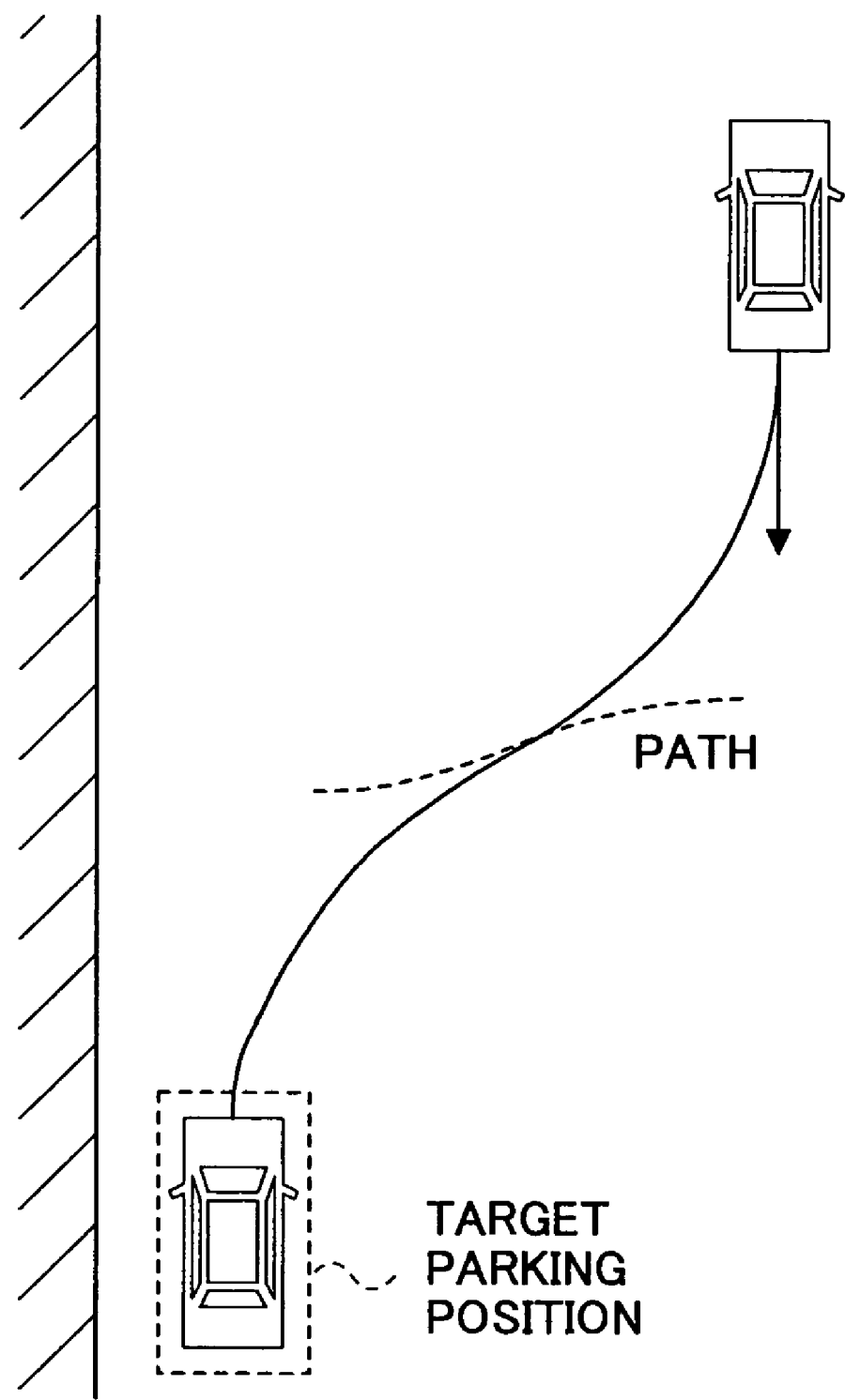
FIG. 5 is an illustration showing a path to a target parking position in a parallel parking operation.

FIG. 5 is an illustration showing a path to a target parking position in a parallel parking operation. In a parallel parking mode, a path to a target parking position of a vehicle is determined in accordance with the above-mentioned relative positional relationship between the vehicle and the target parking position, when a predetermined geometric position condition determined according to a relative positional relationship between a minimum turning radius and a present position of the vehicle and the target parking position of the vehicle, so that a condition where two circles are tangent to each other is established as the path to the target parking position.

In the garage parking mode or the parallel parking mode, the path to the target parking position is computed and determined, target parking position information and path information are stored in the memory 20, and also the parking space frame S is colored in green, for example, in the display screen of the touch display 16 so as to indicate that the parking assist control can be performed. When the path to the target parking position is determined by computation and the fix button K is touched in the state where the parking space frame S is in green, the arrow button switch C and the fix button switch K are caused to disappear from the touch display 16.

On the other hand, if the path to the target parking position cannot be determined by computation due to that the relative position between the vehicle and the target parking position do not satisfy the predetermined relationship, the parking space frame S is colored in red, for example, so as to indicate that the parking assist control cannot be performed, and also the display of the arrow button switch C and the fix button switch K is continued so as to prompt the driver to change the target parking position.

If the vehicle starts to move rearward due to, for example, a creep phenomenon caused by the driver canceling a braking operation in a state where the path to the target parking position is defined and the designation of the target parking position is completed by the touch operation applied to the fix button K on the touch display, the parking assist control is performed thereafter so as to guide the vehicle to the target parking position. Specifically, an amount of travel of the vehicle relative to the road surface after the start of the rearward movement is computed, and a position of the vehicle relative to the defined path to the target parking position is computed based on the computed amount of travel and the EPS 18. Then, a target steering angle for moving the vehicle along the defined path is computed. The computed target steering angle is supplied to the EPS 18. The EPS 18 causes the electric motor to generate a torque to rotate the steering shaft based on the target steering angle supplied by the parking assist ECU 12 so as to move the vehicle along the defined path.

According to the present embodiment, the parking assist control, in which the vehicle is caused to perform an automatic steering along the path to the target parking position set by the operation of the vehicle driver, is achieved when performing garage parking or parallel parking. If the thus-achieved parking assist control is performed, it is unnecessary for the driver to perform a steering operation. For this reason, the parking assist apparatus 10 of the present embodiment can reduce a burden to the driver relating to a steering operation during an operation to perform garage parking or parallel parking.

Figure 6:
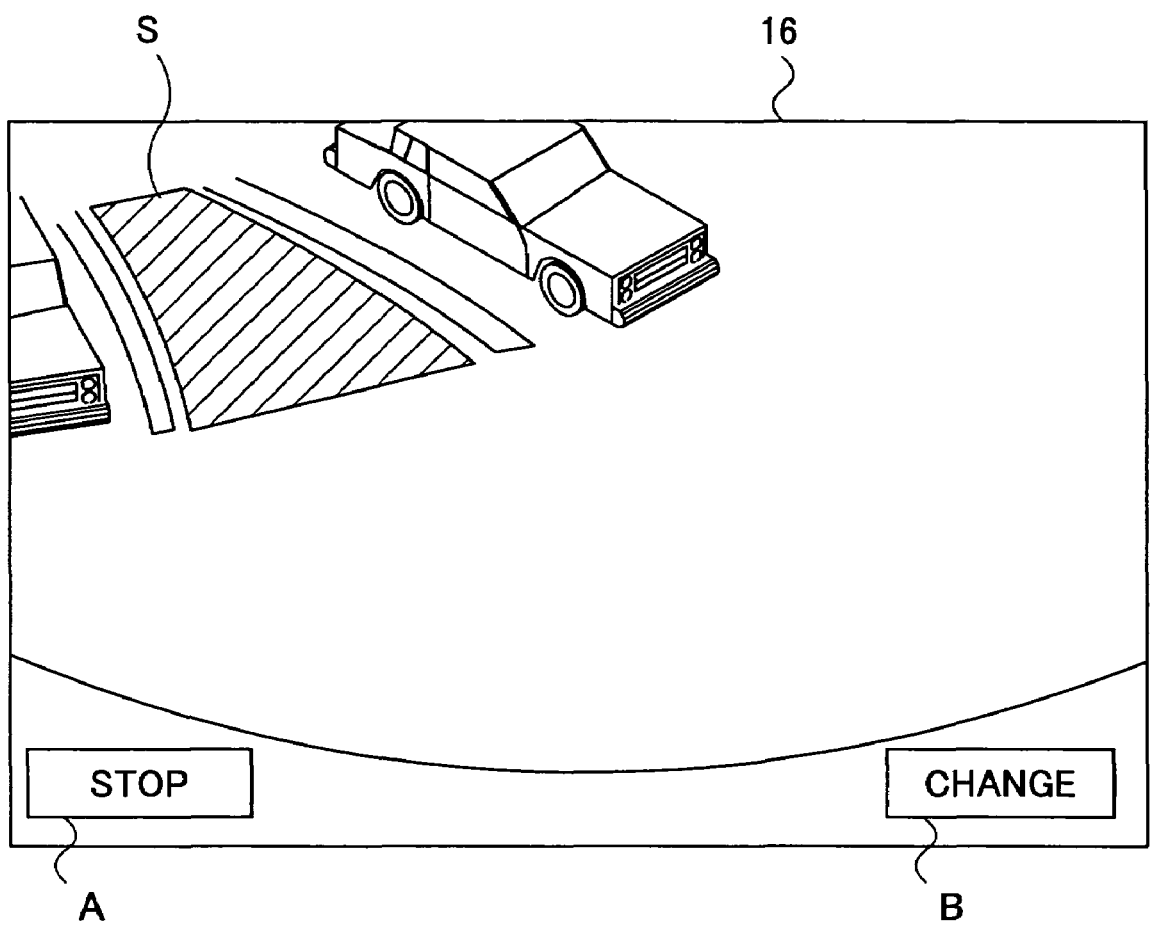
FIG. 6 is an illustration showing a scene displayed on a display screen of the touch display when a vehicle is moved along the path to the target parking position in the parking assist apparatus according to the present embodiment.

FIG. 6 is an illustration showing an image displayed on a display screen of the touch display 16 when the vehicle is moved along the path to the target parking position in the parking assist apparatus 10 according to the present embodiment. It should be noted that FIG. 6 shows the image of a scene taken in the garage parking mode, and a similar image is also displayed in the parallel parking mode.

If the vehicle starts to move rearward in a state where the path to the target parking position is defined and the designation of the target parking position is completed, the computation of an amount of travel of the vehicle is performed as mentioned above, and also a stop button switch A and a change button switch B are displayed on the display screen of the touch display 16 as shown in FIG. 6. The stop button switch A is a switch for stopping the parking assist control toward a target parking position. The change button switch B is a switch for changing the target parking position of the vehicle from a currently designated position to other positions, that is, a switch for achieving a reset of the target parking position. It should be noted that the change switch B is preferably set in an operative state when the vehicle is in a stopped state.

When a touch operation is not applied to the change button switch B, the parking assist control is performed in accordance with the path information and the target parking information stored in the memory 20 at that moment. On the other hand, if the touch operation is applied to the change button switch B, a setting screen the same as that shown in FIG. 3 appears on the display screen of the touch display 16, and the arrow button switch C, the parking space frame 3, which is no colored, and the fix button switch K are displayed in a superimposed manner. After the above-mentioned state is established, the present position of the vehicle is set to an initial position and a path from the initial position to the parking position in accordance with the operated position of the parking space frame S.

The computation of the path to the target parking position, when resetting, is performed in accordance with a steering angle when resetting and a relative relationship between the current position of the vehicle and the target parking position if a condition is different from the condition in the computation of the path at the time of initial setting. Then, a process corresponding to the existence/nonexistence of the defined path in a similar manner to the initial setting mentioned above. Thereafter, the same process is performed each time the change button switch B is touched.

Additionally, if a touch operation is applied to the stop button switch A, the parking assist control toward the target parking position, which is designated at that moment, is stopped so as to stop the guidance of the vehicle. Further, if a vehicle speed exceeds a predetermined speed or if an external disturbance is generated such as a case where the driver perform an interruption steering by operating the steering wheel or by operating a parking brake while the parking assist control is performed after the start of the guidance of the vehicle, the parking assist control is stopped so as to stop the guidance of the vehicle so as to maintain safety during the guidance and assure that the guidance trace matches the defined path.

If the driver desires to resume the guidance to the target parting position after the information regarding the target parking position at which the vehicle is to be parked by the parking assist control is deleted from the memory 20 when the guidance of the vehicle according to the parking assist control is stopped, it is required for the driver to perform again the designation of the target parking position by displacing the parking space frame S so as to adjust the parking space frame by operating the target space frame S on the screen display of the touch display 16. For this reason, in the above-mentioned structure, it is inconvenient for the driver to perform resetting operation of the target parking position after the vehicle guidance is stopped. Thus, the system according to the present embodiment is provided to eliminate the above-mentioned inconvenience.

Figure 7:
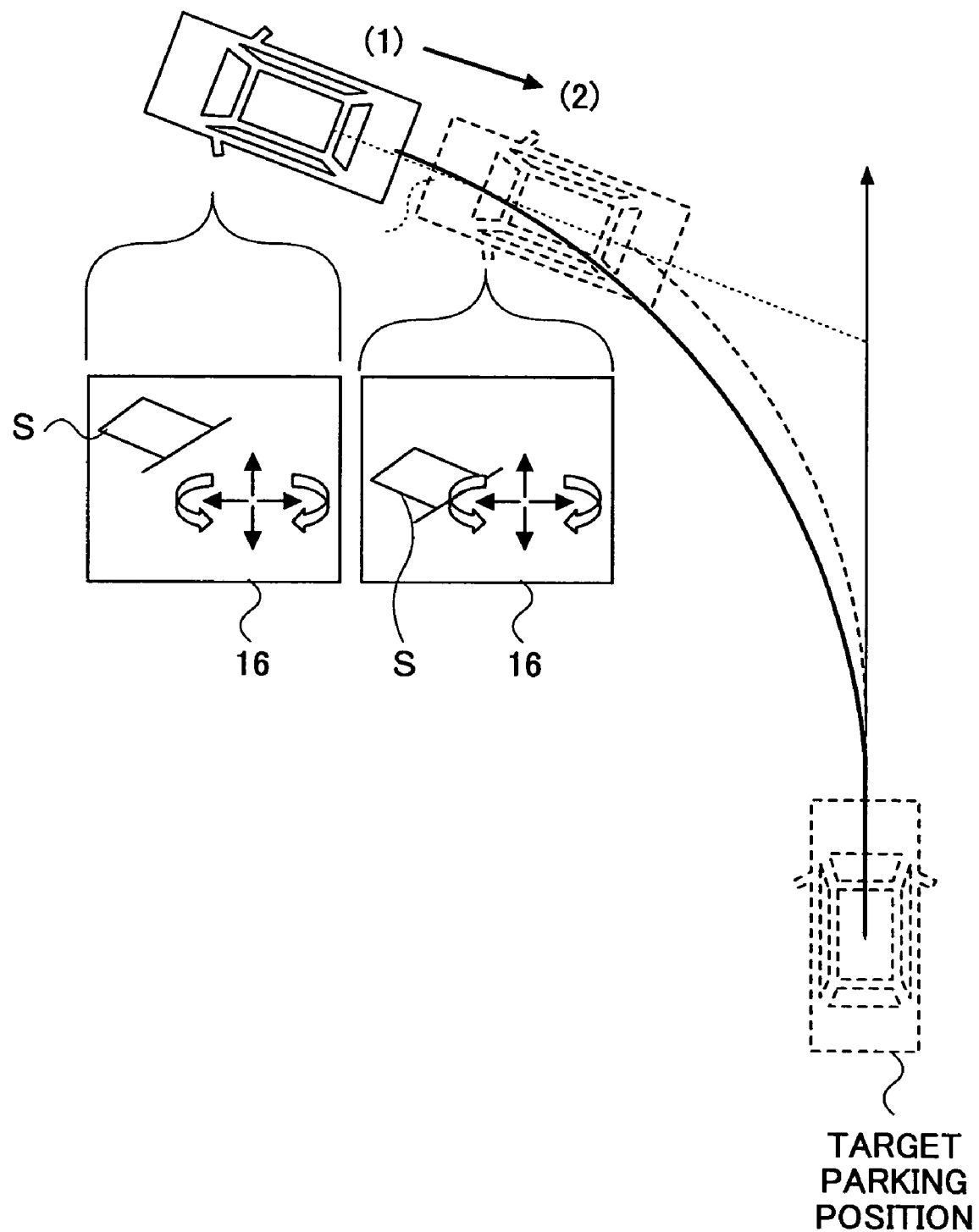
FIG. 7 is an illustration for explaining an operation achieved by the parking assist apparatus according to the present embodiment.

FIG. 7 is an illustration for explaining an operation achieved by the parking assist apparatus 10 according to the present embodiment. It should be noted that FIG. 7 illustrates a scene in the garage parking mode. In the parking assist apparatus 10 according to the present embodiment, if the above-mentioned cancellation condition is established in which the guidance of the vehicle according to the parking assist control is stopped in the process of guidance of the vehicle along the path (indicated by a solid line in FIG. 7) from the initial position (indicated by (1) in FIG. 7) to the designated target parking position, the guidance of the vehicle is actually stopped, while continuously storing the position information of the target position in the memory 20, the target position being an absolute position relative to the road surface where the vehicle is to be parked according to the parking assist control having been performed.

Moreover, after the above-mentioned cancellation condition is established, a computation of the path to the target parking position is performed in accordance with the positional relationship between the current position of the vehicle on the road surface and the target parking position of which information is continuously stored in the memory 20. Then, if the path is not defined, the switch M1 for garage parking mode and the switch M2 for the parallel parking mode appear on the display screen of the touch display 16 as shown in FIG. 2. In this case, as mentioned above, the parking assist control is performed so as to guide the vehicle to the reset target parking position by the driver performing a process similar to the initial setting of the target parking position.

On the other hand, if the path (indicated by a dashed line in FIG. 7) is defined by computation, the initial screen as shown in FIG. 2 does not appear on the display screen but the setting screen for the garage parking mode or the parallel parking mode is displayed in which the parking space frame S, the arrow button switch C and the fix button switch K appear on the display screen of the touch display 16 as shown in FIG. 3. In such a case, the position at which the parking space frame S appears accurately corresponds to the position (absolute position) of the target parking position on the road surface which target parking position corresponds to the information continuously stored in the memory after the stop of the guidance. Thereafter, the target parking position is moved if necessary by an operation applied to the parking space frame S, and when the fix button switch K is operated, the parking assist control is performed so as to guide the vehicle to the reset target parking position.

According to the above-mentioned structure, even after the guidance is stopped and canceled due to an excessive speed or an interruption operation during the guidance of the vehicle according to the parking assist control, the information regarding the absolute position of the target parking position on the road surface can be read out from the memory 20. Then, if the path to the read target parking position is defined by computation, the reset of the target position completely the same target parking position of which guidance was once stopped is reset with an easy operation by the driver without performing designation of the target parking position from the initial screen. Therefore, according to the parking assist apparatus 10 of the present embodiment, even after the guidance of the vehicle is stopped or canceled during the process of the guidance according to the parking assist control, the guidance to the target parking position completely the same target parking position of which guidance was once stopped can be achieved by the parking assist control with an easy operation.

It should be noted that the position information of the target parking position stored in the memory may be maintained until a touch operation is applied to the fix button switch K, that is, the reset of the target parking position is fixed. Moreover, the timing of the deletion of the position information is not limited to the touch operation being applied to the fix button switch k, and the deletion may be performed when a predetermined operation is performed after the fixing operation is performed or when a predetermined deleting operation is performed after the parking space frame S, which displays the target parking position concerned, appears on the display screen of the touch display 16.

Moreover, if the path to the target parking position concerned is defined be computation after the guidance of the vehicle according to the parking assist control is stopped or cancelled, the display screen of the touch display 16 shifts not to the initial screen as shown in FIG. 2 but to the setting screen as shown in FIG. 3. Although the setting screen as shown in FIG. 3 appears only when a predetermined operation is performed by the operator on the initial screen as shown in FIG. 2, the setting screen appears according to the present embodiment without routing through the initial screen as shown in FIG. 2. Therefore, according to the parking assist apparatus 10 of the present embodiment, when the driver performs the resetting operation of the target parking position, a burden to the vehicle driver is reduced.

Especially, the parking space frame S in the shifted setting screen appears at a position corresponding to the target parking position of which guidance was stopped. In this case, if a touch operation is applied to the fix button switch K without displacing the parking space frame S on the setting screen, it is possible to guide the vehicle again to the position completely the same as the target pairing position of which guidance was stopped. Therefore, a single touch operation by the driver achieves the reset of the target parking position to the absolute position the same as the target parking position of which guidance was cancelled, thereby reducing a burden to the vehicle driver in association with the resetting operation.

Figure 8:
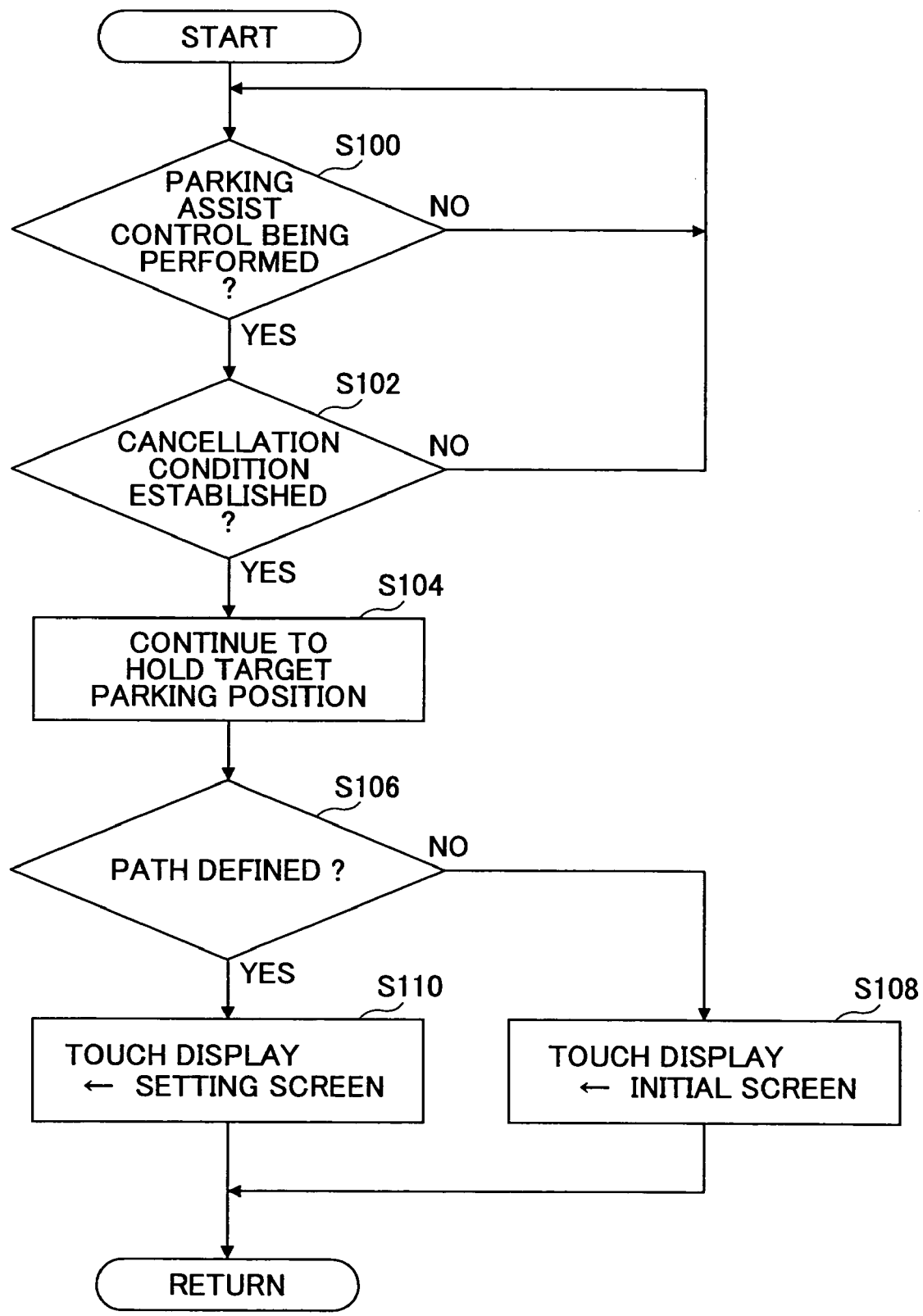
FIG. 8 is a flowchart of a control routine executed by a parking assist ECU.

FIG. 8 is a flowchart of a control routine which the parking assist ECU 12 executes in the present embodiment so as to achieve the above-mentioned function. The routine shown in FIG. 8 is repeatedly started each time the process of the routine is completed. When the routine shown in FIG. 8 is started, first, the process of step S100 is performed.

In step S100, it is determined whether or not the parking assist control to guide the vehicle along the path to the designated target parking position is currently performed. The process of step S100 is repeatedly performed until the affirmative determination is made. Consequently, if it is determined that the parking assist control is being performed, the process of step S102 is performed.

In step S102, it is determined whether or not the cancellation condition, such as an excessive speed or an interrupting operation, for stopping the parking assist control is established. Here, it is determined whether or not there is established the cancellation condition that is not the intention of the driver when the parking assist control is performed. Consequently, if a negative determination is made, the process of step S100 is performed again. On the other hand, if the cancellation condition is established and an affirmative determination is made, the process of step S104 is performed.

In step S104, the automatic steering of the vehicle is stopped by stopping the guidance of the vehicle according to the parking assist control, and even after such a stop is made, a process of holding in the memory 20 the information regarding the absolute position of the target parking position to which the vehicle was to be guided and parked according to the parking assist control is performed.

In step S106, it is determined whether or not the path to the target parking position is defined by computation in accordance with the positional relationship between the position of the vehicle on the road surface and the absolute position of the target parking position of which information is continuously held in the memory 20. Consequently, if it is determined that the path is not defined, the process of step S108 is performed. On the other hand, if it is determined that the path is defined, the process of step S110 is performed.

In step S108, a process of displaying the initial screen on the touch display 16 is performed so that the switch M1 for the garage parking mode and the switch M2 for the parallel parking mode appear on the display screen of the touch display 16 as shown in FIG. 2. After the process of step S108 is performed, it is possible to perform the guidance to the reset target parking position by a process the same as the process for the initial designation of the target parking position. When the process of step S108 is completed, the routine at this time is ended.

In step S110, a process of displaying the setting screen for the garage parking mode or the parallel parking mode on the display screen of the touch display 16 is performed so as to display the parking space frame S, the arrow button switch C and the fix button switch K on the display screen. After the process of step S110 is performed, it is possible to perform the guidance of the vehicle by setting the absolute position, which is completely the same as the previous target parking position of which guidance of the vehicle was stopped, as the target parking position. When the process of step S110 is completed, the routine at this time is ended.

According to the routine shown in FIG. 8, after the guidance of the vehicle according to the parking assist control is stopped or cancelled due to an excessive speed or an interrupting steering operation, the information regarding the absolute position of the target parking position on the road surface is continuously stored in the memory. Therefore, even after the stop or cancellation of the guidance of the vehicle, the absolute position of the previous target position can be read from the memory 20 and can be reset as a new target position. Thus, the guidance of the vehicle to the absolute position, which is the same as the previous target position of which guidance was once stopped, can be achieved with a simple operation.

Moreover, according to the above-mentioned routine shown in FIG. 8, when the path from the position of the vehicle on the road surface to the target parking position to which the vehicle was to be guided and stored in the memory 20 is defined by computation, the display screen of the touch display 16 can be shifted to the setting screen by skipping the initial screen. Accordingly, the burden to the driver in operation of the parking assist apparatus 10 can be reduced when the drive resets the target parking position.

Furthermore, as mentioned above, the parking space frame S on the shifted setting screen appears at a position corresponding to the target parking position of which guidance was stopped. In this case, since the resetting operation to set the target parking position to the previous parking position of which guidance was cancelled can be easily performed by a single touch operation, the burden to the vehicle driver who is resetting the target parking position can be reduced.

In the above-mentioned embodiment, the parking space frame S corresponds to a "target parking position designation display", and the memory 20 corresponds to "memory holding means". Additionally, "target parking position setting means" is achieved by the parking assist ECU 12 setting the target parking position of the vehicle on the real road surface; "screen control means" is achieved by the parking assist ECU 12 performing the process of steps S108 and S110 of the routine shown in FIG. 8; and "cancellation condition determination means" is achieved by the parking assist ECU 12 performing the process of step S102 of the routine shown in FIG. 8. Additionally, "screen controlling means" is achieved by the parking assist ECU 12 performing the process of steps S106, S108 and S110 of the routine shown in FIG. 8.

It should be noted that although only the automatic steering using the electrical motor of the EPS 18 is performed as the parking assist control to move the vehicle along the path to the target parking position in the above-mentioned embodiment, the present invention is not limited to such an automatic steering. That is, a drive or stop of the vehicle may be automatically performed without depending on an operation of the driver, and, further, a driver operation may be assisted by voice guidance or a display of auxiliary lines on the display screen of the touch display 16.

Moreover, although the path to the target parking position is computed based on the positional relationship between the position of the vehicle on the road surface and the target parking position continuously stored in the memory 20 after the cancellation condition of the parking assist control is established in the above-mentioned embodiment, the computation of the path may be performed only in a condition in which the vehicle is stopped.

Further, although the display screen of the touch display 16 is shifted to the initial screen as shown in FIG. 2 when the path to the target parking position is not defined by computation, and, on the other hand, the touch display 16 is shifted to the setting screen as shown in FIG. 3 when the path to the target parking position is defined by computation in the above-mentioned embodiment, the display screen may be shifted to an upper-level screen from among a hierarchal screens when the path is not defined, and, on the other hand, the display screen may be shifted to a lower-level screen, which only appears through the upper-level screen and at which the target parking position can be designated, when the path is defined.

Additionally, the memory holding of the target parking position may be cancelled if a movement of the vehicle is detected, especially, when a movement exceeding a predetermined distance is detected, after establishment of the cancellation condition since there may be a case where there is a low possibility of using the same parking position when such a movement exceeding a predetermined distance is detected after establishment of the cancellation condition.

The present invention is not limited to the specifically disclosed embodiments, and variations and modifications may be made without departing form the scope of the present invention.

The present application is based on Japanese priority application No. 2003-209334 filed Aug. 28, 2003, the entire contents of which are hereby incorporated by reference.

What is claimed is:

1. A parking assist apparatus for guiding a vehicle toward a target parking position, comprising:

target parking position setting means for setting the target parking position in accordance with an operation applied to a target parking position designation display that is displayed on a screen showing a periphery of said vehicle; and cancellation condition determining means for determining whether a cancellation condition of canceling a guidance of said vehicle toward the target parking position is established, wherein:

said target parking position setting means is capable of setting an absolute position represented by a target parking position information held by a memory holding means as a new target parking position;

said memory holding means is adapted to continuously hold said target parking position information regarding the absolute position of the target parking position set by said target parking position setting means after the cancellation condition is established;

characterized by the parking assist apparatus further comprising:

path computation determining means adapted to determine, in a state where the cancellation condition is established and the guidance of said vehicle is stopped and said vehicle is stopped at a stop position, whether or not a path from the stop position to the absolute position is defined by computation; and screen controlling means adapted to shift the screen to an initial screen when the path is not defined by computation, and to a setting screen for setting the target parking position when the path is defined by computation.

2. The parking assist apparatus as claimed in claim 1, wherein said memory holding means is adapted to hold the target parking position information of said absolute position after the cancellation condition is established and until resetting of the target parking position is performed by said target parking position setting means.

3. The parking assist apparatus as claimed in claim 1, wherein said memory holding means is adapted such that the holding of the target parking position information by said memory holding means is canceled when a movement of said vehicle exceeding a certain distance is detected after the cancellation condition is established.

4. The parking assist apparatus as claimed in claim 1, wherein said target parking position setting means is capable of setting the absolute position represented by the target parking position information held by said memory holding means as a new target parking position.

5. The parking assist apparatus as claimed in claim 4, further comprising screen controlling means for controlling contents displayed on the screen when the guidance of said vehicle is stopped due to an establishment of the cancellation condition so that the contents displayed on the screen is changed in accordance with a result of computation of a path from a current position of said vehicle to the new target parking position.

6. The parking assist apparatus as claimed in claim 5, wherein the screen controlling means shifts the screen to an initial screen when the path is not defined by computation.

7. The parking assist apparatus as claimed in claim 5, wherein the screen controlling means shifts the screen to a setting screen for setting the target parking position when the path is defined by computation.

8. The parking assist apparatus as claimed in claim 6, wherein the screen controlling means shifts the screen to a setting screen for setting the target parking position when the path is defined by computation.

9. The parking assist apparatus as claimed in claim 1, wherein the holding of the target parking position information by said memory holding means is cancelled when a movement of said vehicle is detected after the cancellation condition is established.

* * * * *

UNITED STATES PATENT AND TRADEMARK OFFICE
CERTIFICATE OF CORRECTION

PATENT NO. : 7,526,368 B2
APPLICATION NO. : 10/927819
DATED : April 28, 2009
INVENTOR(S) : Tomohiko Endo et al.

It is certified that error appears in the above-identified patent and that said Letters Patent is hereby corrected as shown below:

In the Title Page:  After the listing of the inventors, change the assignee information to read as follows:

--(73) Assignee:  Toyota Jidosha Kabushiki Kaisha, Toyota-shi (JP)
Aisin Seki Kabushiki Kaisha, Kariya-shi (JP)--.

| Column | Line | |
|---|---|---|
| 1 | 14 | Before "a target" delete "the". |
| 1 | 26 | Change "parting" to --parking--. |
| 1 | 30 | After "such as" change "that" to --when--. |
| 1 | 31 | After "or" change "that" to --when--. |
| 2 | 15 | Change "holds" to --hold--. |
| 5 | 23 | After "shifted" insert --in--. |
| 6 | 30 | Change "due to that" to --because--. |
| 7 | 30 | Change "which is no" to --which is not--. |
| 7 | 53 | Change "perform" to --performs--. |
| 8 | 48 | Change "stop" to --stopping--. |
| 9 | 12 | Change "button switch k" to --button switch K--. |
| 9 | 19 | After "defined" change "be" to --by--. |
| 11 | 40 | After "among" delete "a". |
| 11 | 55 | Change "form" to --from--. |

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,526,368 B2  
APPLICATION NO. : 10/927819  
DATED : April 28, 2009  
INVENTOR(S) : Tomohiko Endo et al.

Page 1 of 1

It is certified that error appears in the above-identified patent and that said Letters Patent is hereby corrected as shown below:

<u>In the Title Page:</u> After the listing of the inventors, change the assignee information to read as follows:

--(73) Assignee: Toyota Jidosha Kabushiki Kaisha, Toyota-shi (JP)
Aisin Seiki Kabushiki Kaisha, Kariya-shi (JP)--.

| Column | Line | |
|---|---|---|
| 1 | 14 | Before "a target" delete "the". |
| 1 | 26 | Change "parting" to --parking--. |
| 1 | 30 | After "such as" change "that" to --when--. |
| 1 | 31 | After "or" change "that" to --when--. |
| 2 | 15 | Change "holds" to --hold--. |
| 5 | 23 | After "shifted" insert --in--. |
| 6 | 30 | Change "due to that" to --because--. |
| 7 | 30 | Change "which is no" to --which is not--. |
| 7 | 53 | Change "perform" to --performs--. |
| 8 | 48 | Change "stop" to --stopping--. |
| 9 | 12 | Change "button switch k" to --button switch K--. |
| 9 | 19 | After "defined" change "be" to --by--. |
| 11 | 40 | After "among" delete "a". |
| 11 | 55 | Change "form" to --from--. |

This certificate supersedes the Certificate of Correction issued June 8, 2010.

Signed and Sealed this  
Twenty-fifth Day of January, 2011

David J. Kappos  
*Director of the United States Patent and Trademark Office*